(12) United States Patent
     Hoshino

(10) Patent No.: US 12,631,006 B2
(45) Date of Patent: May 19, 2026

(54) REMOTE OPERATION SYSTEM

(71) Applicant: HITACHI CONSTRUCTION MACHINERY CO., LTD., Tokyo (JP)

(72) Inventor: Kazunori Hoshino, Tsukuba (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 14 days.

(21) Appl. No.: 18/845,039

(22) PCT Filed: Mar. 22, 2023

(86) PCT No.: PCT/JP2023/011340
     § 371 (c)(1),
     (2) Date: Sep. 9, 2024

(87) PCT Pub. No.: WO2023/182387
     PCT Pub. Date: Sep. 28, 2023

(65) Prior Publication Data
     US 2025/0179771 A1      Jun. 5, 2025

(30) Foreign Application Priority Data

Mar. 23, 2022    (JP) ................................ 2022-047428

(51) Int. Cl.
     *G06Q 50/08*       (2012.01)
     *E02F 9/20*        (2006.01)
     *G06Q 10/0631*     (2023.01)
(52) U.S. Cl.
     CPC ...... *E02F 9/205* (2013.01); *G06Q 10/063112* (2013.01); *G06Q 50/08* (2013.01)
(58) Field of Classification Search
     None
     See application file for complete search history.

(56) References Cited

U.S. PATENT DOCUMENTS 11,644,830 B1 *  5/2023  Gate .................... G05D 1/0038
                                                  701/2
2019/0155237 A1 *  5/2019  Kean ................. G05B 19/0423
                     (Continued)

FOREIGN PATENT DOCUMENTS

EP        3 922 775 A1     12/2021
JP      2007-019733 A       1/2007
                     (Continued)

OTHER PUBLICATIONS

International Preliminary Report on Patentability received in corresponding International Application No. PCT/JP2023/011340 dated Oct. 3, 2024.
                     (Continued)

*Primary Examiner* — Shelley Chen
(74) *Attorney, Agent, or Firm* — MATTINGLY & MALUR, PC

(57)                ABSTRACT

In a remote operation system that includes a matching server for matching a construction machine and a plurality of remote operation devices, wherein the matching server searches for and presents candidate works to a first remote operation device operated by a first operator who has logged in and authenticated, searches for a second operator, when a notification of an assist request is received from the first remote operation device for the selected work selected from the candidate works, the second operator who can assist the selected work from among the logged-in operators based on the database, informs a second remote operation device operated by the second operator of the assist request and the work related to the assist request, communicatively connects both of the first and the second remote operation devices to the construction machine to be operated for the selected work based on the database, when a notice of acceptance of the assist request from the second remote operation device.

4 Claims, 5 Drawing Sheets

(56) References Cited

U.S. PATENT DOCUMENTS

| | | | | |
|---|---|---|---|---|
| 2022/0004166 A1* | 1/2022 | Saiki | .................. | G06Q 10/06 |
| 2022/0186466 A1* | 6/2022 | Otani | .................. | E02F 9/262 |
| 2022/0389683 A1 | 12/2022 | Sawada et al. | | |
| 2023/0080981 A1* | 3/2023 | Grueneberg | ... | G06Q 10/063112 |
| | | | | 705/7.14 |

FOREIGN PATENT DOCUMENTS

| | | | | | |
|---|---|---|---|---|---|
| JP | 2020-077294 | A | 5/2020 | | |
| JP | 2021-086227 | A | 6/2021 | | |
| JP | 7302244 | B2 * | 7/2023 | ......... | G06Q 10/0639 |

OTHER PUBLICATIONS

International Search Report of PCT/JP2023/011340 dated Jun. 13, 2023.
Extended European Search Report received in corresponding European Application No. 23774982.5 dated Feb. 25, 2026.

* cited by examiner

REMOTE OPERATION SYSTEM

TECHNICAL FIELD

The present invention relates to a remote operation system for remotely operating a construction machine such as a hydraulic excavator.

BACKGROUND ART

With an aging of construction machine operators, a remote operation system to remotely operate an unmanned construction machine has been developed as one measure to solve a problem of the operator shortage. According to the remote operation system, there is an advantage that it is easier to secure the operators because they do not need to actually go to a work site and there are fewer geographical constraints. One such remote operation system is known, which presents candidates for operations to be performed remotely to the operator, allowing the operator to select the operation (Patent Document 1).

PRIOR ART DOCUMENT

Patent Document

Patent Document 1: JP 2020-77294A

SUMMARY OF THE INVENTION

Problem to be Solved by the Invention

In the remote operation of construction machine, there is a range of individual differences in operator skills from beginners to experts. Generally, beginners are not able to undertake works that require advanced skills. Furthermore, for beginners, without having skilled experts nearby as role models, acquiring skills can become self-taught, making it difficult to efficiently learn remote operation skills.

An object of the present invention is to provide a remote operation system that can efficiently improve the skills of operators in the remote operation of construction machine.

Means for Solving the Problem

To achieve the above objective, the present invention provides a remote operation system including a construction machine, a plurality of remote operation devices for remotely operating the construction machine, and a matching server for matching any of the plurality of remote operation devices with the construction machine, wherein the matching server is configured to store a database including authentication data of a plurality of operators, possessed skill data related to skills possessed by each of the plurality of operators, construction machine data related to the construction machine arranged at a the work site, and required skill data related to skills required for operations using the construction machine at the work site, search for candidate works that can be contracted by a first operator based on the database and present the candidate works to a first remote operation device operated by the first operator who has logged in and authenticated, search for a second operator, when a notification of an assist request from the first remote operation device for a selected work selected from the candidate works received, the second operator who can assist the selected work from among the logged-in operators based on the database, inform a second remote operation device operated by the second operator of the assist request and the work related to the assist request, and communicatively connect both of the first and second remote operation devices to the construction machine to be operated for the selected work based on the database, when a notice of acceptance of the assist request from the second remote operation device.

Advantages of the Invention

According to the present invention, it is possible to efficiently improve the skills of operators in the remote operation of construction machine.

EMBODIMENTS FOR CARRYING OUT THE INVENTION

An embodiment of the present invention are described below with reference to the drawings.

—Remote Operation System—

Figure 1:
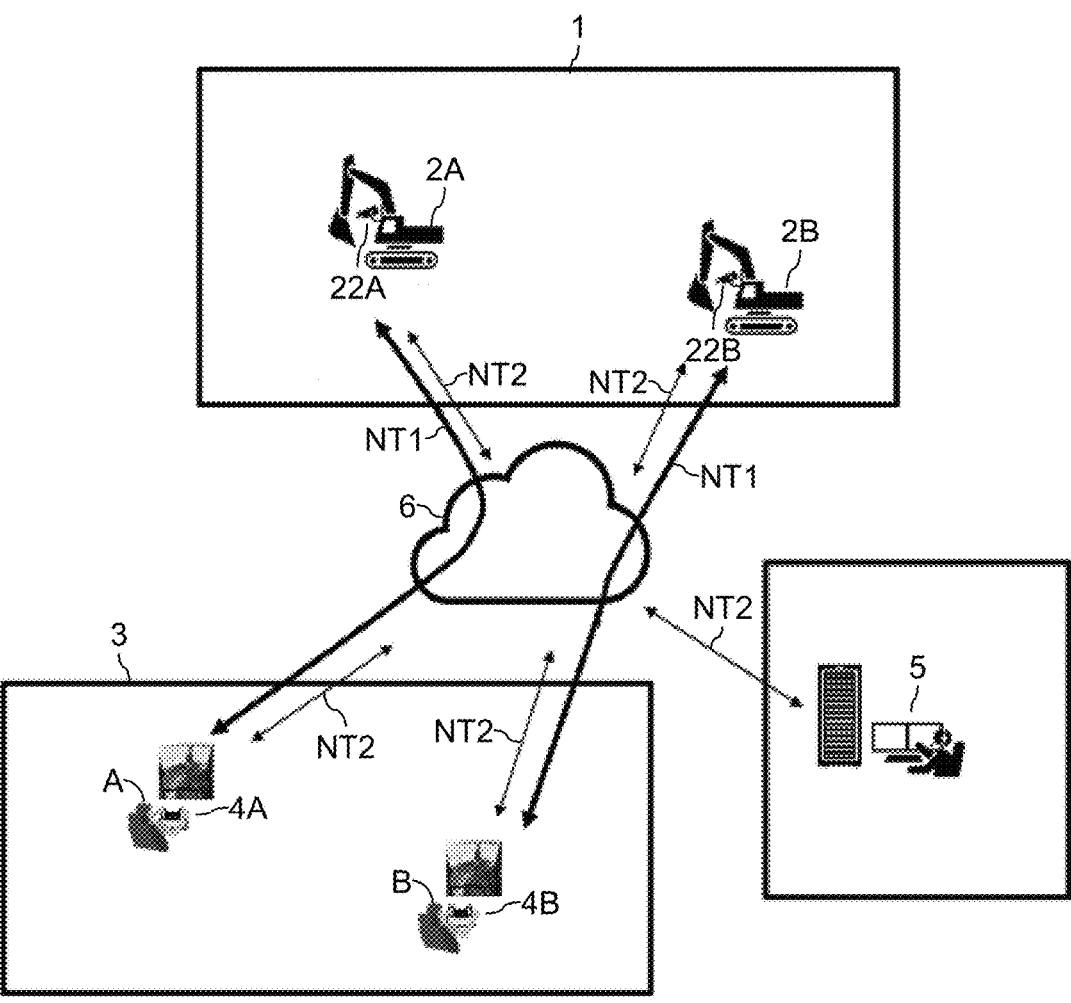
FIG. 1 is a schematic diagram of a remote operation system according to an embodiment of the present invention.
Figure 2:
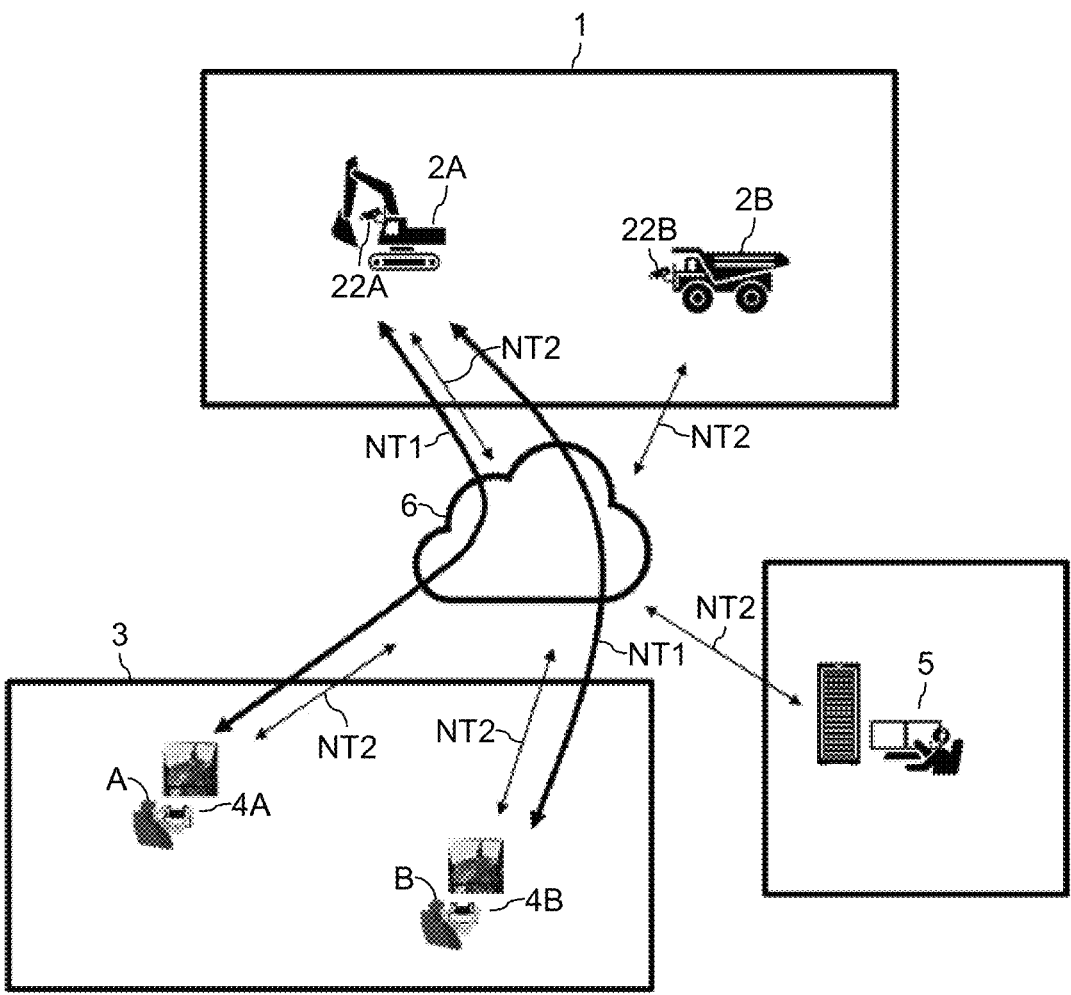
FIG. 2 is a schematic diagram of a remote operation system according to an embodiment of the present invention.
Figure 3:
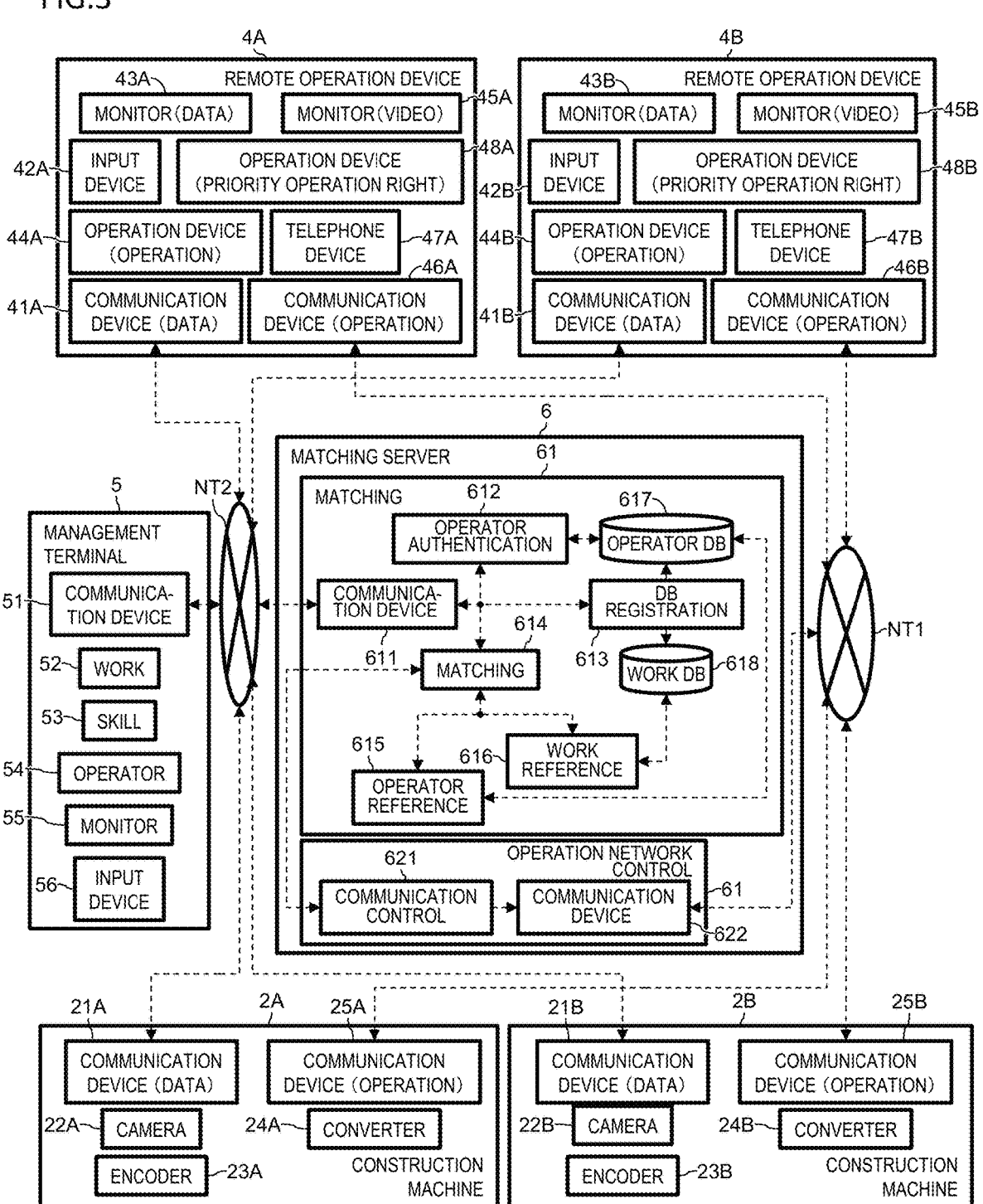
FIG. 3 is a block diagram of a remote operation system according to an embodiment of the present invention.

FIG. 1 and FIG. 2 are schematic diagrams of a remote operation system according to one embodiment of the present invention. FIG. 3 is a block diagram of the remote operation system according to one embodiment of the present invention. The remote operation system illustrated in FIGS. 1-3 comprises radio-controllable construction machines 2A and 2B, a plurality of remote operation devices 4A and 4B for remotely operating the construction machines 2A and 2B, and a matching server 6 that matches any of the plurality of remote operation devices 4A and 4B with the construction machines 2A and 2B. The construction machines 2A and 2B is arranged at a work site 1. The remote operation devices 4A and 4B are located in an operation room 3 away from the work site 1.

—Construction Machine—

The construction machines 2A and 2B are typically hydraulic excavators, but may be other construction machines such as dump trucks, bulldozers, wheel loaders, scrapers, etc., not limited to hydraulic excavators. FIG. 1 illustrates a case where both construction machines 2A and 2B are hydraulic excavators, and FIG. 2 illustrates a case where construction machine 2A is a hydraulic excavator and construction machine 2B is a dump truck. Also, construction machines 2A and 2B are typically self-propelled construction machines capable of moving on its own but may also be stationary construction machine. The construction machines 2A and 2B may be of the same or different types of construction machine. FIG. 1 shows two construction machines 2A and 2B at the work site 1, but the number of construction machine at the work site 1 may be one or more than three. Also, while only one work site 1 is shown in FIG. 1, there may be cases where only one work site 1 is registered in the system, but typically plural work sites 1 are registered in the system.

The construction machine 2A comprises a communication device 21A for data communication, a camera 22A, an encoder (video transmission unit) 23A, a converter (operation signal receiving unit) 24A, and a communication device 25A for remote operation. Similarly, construction machine 2B comprises a communication device 21B for data communication, a camera 22B, an encoder (video transmission unit) 23B, a converter (operation signal receiving unit) 24B, and a communication device 25B for remote operation.

The communication devices 21A and 21B serve to transmit and receive data related to matching to and from the matching server 6 via a matching information network NT2.

The cameras 22A and 22B are in-machine cameras that capture video images as seen from an operator's seat.

The encoders 23A and 23B serve to convert the video images captured by the cameras 22A and 22B into digital signals for output.

The converters 24A and 24B serve to convert communication signals related to operations input from the remote operation devices connected into control signals for in-machine equipments.

The communication devices 25A and 25B serve to transmit and receive data related to remote operation (network operation signals and network video signals) to and from the remote operation devices connected via the remote operation network NT1.

The communication devices 21A and 21B of the construction machines 2A and 2B connect to the matching server 6 via the matching information network NT2. When construction machines 2A and 2B becomes capable of remote operation following startup operations, they transmit a standby notification indicating they are in an operable state to the matching server 6 via the communication devices 21A and 21B and the matching information network NT2. An operable state refers to a state capable of remote operation, for example, when the engine has transitioned to an operational state, and cameras 22A and 22B and communication devices 25A and 25B are activated.

Furthermore, the operable construction machines 2A and 2B are appropriately connected for communication with the remote operation devices 4A and 4B in the operation room 3 via the communication devices 25A and 25B and the remote operation network NT1, according to a communication control processing 621 of the matching server 6. In this embodiment, for example, in addition to the case where the remote operation devices 4A and 4B are communicatively connected to the construction machines 2A and 2B, respectively, as shown in FIG. 1, the remote operation devices 4A and 4B may be communicatively connected to the same construction machine 2A as shown in FIG. 2.

The video images captured by the cameras 22A and 22B is converted into the network video signals by the encoders 23A and 23B respectively and transmitted from communication devices 25A and 25B to the communicatively connected remote operation devices via the remote operation network NT1. Also, the network operation signals transmitted from the communicatively connected remote operation devices are received by the communication devices 25A and 25B, converted into analog or digital operation signals by the converters 24A and 24B respectively, and output to the corresponding equipment mounted on the construction machines 2A and 2B.

For example, as shown in FIG. 1, when remote operation devices 4A and 4B are each communicatively connected to the construction machines 2A and 2B, the construction machine 2A operates in response to an operation of the remote operation device 4A, and the construction machine 2B operates in response to an operation of the remote operation device 4B. Furthermore, as shown in FIG. 2, when the remote operation devices 4A and 4B are communicatively connected to the same construction machine 2A, the construction machine 2A operates in response to the operation of either remote operation device 4A or 4B, under a priority operation right described later.

—Remote Operation Devices—

The remote operation devices 4A and 4B are devices that simulate a cab of the construction machine being controlled, and the type of operating devices 44A and 44B (described later) varies depending on the construction machine being controlled. FIGS. 1 and 2 illustrate two remote operation devices 4A and 4B placed in the operation room 3, but the number of remote operation devices placed in the system is not limited to two, three or more remote operation devices may also be placed in the system. Also, the remote operation devices 4A and 4B do not need to be arranged in the same operation room 3. In this embodiment, an operator controlling the remote operation device 4A is referred to as an operator A, and an operator controlling the remote operation device 4B is referred to as an operator B. For the sake of explanation, in terms of remote operation of the construction machine, the operator A is a beginner, the operator B is an expert, and the operator A has a lower proficiency (described later) than the operator B.

The remote operation device 4A comprises a communication device 41A, an input device 42A, a monitor 43A for data display, the operating device 44A for the remote operation, a monitor 45A for video display, a communication device 46A, a telephone device 47A, and an operating device 48A for setting the priority operation right. Similarly, the remote operating device 4B comprises a communication device 41B, an input device 42B, a monitor 43B for data display, the operating device 44B for the remote operation, a monitor 45B for video display, a communication device 46B for the remote operation, a telephone device 47B, and an operating device 48B for setting the priority operation right.

The communication devices 41A and 41B are devices for data communication related to matching. These communication devices 41A and 41B serve to transmit and receive data related to the matching to and from the matching server 6 via the matching information network NT2.

The input devices 42A and 42B are devices for inputting data, for example, devices such as keyboards or touch panels can be used.

The monitors 43A and 43B are display devices for displaying input data, received data, etc. If the touch panels are used for the monitors 43A and 43B, they can also serve as the input devices 42A and 42B.

The operating devices 44A and 44B are devices that simulate operating devices of remotely controlled construction machines. These operating devices 44A and 44B vary by type of construction machine, for example, if the machine being controlled is a hydraulic excavator, operating lever devices are used, and if the machine being controlled is a dump truck, handles and pedals are used.

The monitors 45A and 45B are display devices that display in real-time the video captured by the cameras 22A and 22B of the construction machines 2A and 2B. The monitors 45A and 45B serve as pseudo-windows that display the video images of the work site 1 corresponding to the view from the operator's seat or an equivalent position of the construction machines 2A and 2B.

The communication devices 46A and 46B are devices for data communication related to the remote operation. These communication devices 46A and 46B serve to transmit and receive data related to the remote operation (the network operation signals or the network video signals) to and from the construction machine connected via the remote operation network NT1.

The telephone devices 47A and 47B are devices for voice call with operators who operate other remote operation devices, comprising a microphone, a speaker, and so on. The telephone devices 47A and 47B can be configured to communicate with each other via the matching information network NT2, for example. These telephone devices 47A and 47B can be adopted in forms that are installed on consoles or monitors, but are not limited to such forms and can also take the form of headsets or handsets. For example, direct communication can be made between two operators A and B who operate the remote operation devices 4A and 4B via the telephone devices 47A and 47B.

It should be noted that the means for direct communication between operators are not limited to devices for voice calls, devices for text communication such as chat can also be adopted.

The operating devices 48A and 48B are devices for setting the priority operation right. For example, in the state where the remote operation devices 4A and 4B are connected to the same construction machine, it is possible to set by the operating devices 48A and 48B which of their network operation signals is given priority. As the operating devices 48A and 48B, dedicated mechanical operating devices can be provided in the remote operation devices 4A and 4B, but for example, when using touch panels as the monitors 43A and 43B, the monitors 43A and 43B can also serve as the operating devices 48A and 48B. Furthermore, a form can be adopted where a priority operation right setting screen is displayed on the monitors 43A and 43B, and the setting operation for the priority operation right is performed through setting input using the input devices 42A and 42B. In other words, it is acceptable for the input devices 42A and 42B to also serve as the operating devices 48A and 48B.

In this embodiment, when the remote operation devices 4A and 4B are communicatively connected to the same construction machine 2A, the priority operation right is set for one of the remote operation devices (described later). For example, if the priority operation right is set for the remote operation device 4B, it is possible to transmit a setting signal, that disables the network operation signal by the remote operation device 4A, from the remote operation device 4B to the matching server 6 by operating the operating device 48B of the remote operation device 4B. In this case, the remote operation network NT1 is controlled by the matching server 6 according to the aforementioned setting signal, and the operation of the construction machine 2A by the remote operation device 4A becomes invalid. Moreover, there may be cases where inconvenience arises from one operator uniformly holding the priority operation right. In such cases, it is also possible for the operators of the remote operation devices 4A and 4B to consult with each other and transfer the priority operation right between the remote operation devices 4A and 4B by performing a specified operation with the operating devices 48A and 48B. For example, if a specified setting signal is input from the remote operation device 4A or 4B in accordance with a predetermined operation of the operating devices 48A and 48B, the matching server 6 selectively set the priority operation right for the construction machine 2A to one of the remote operation device 4A or 4B based on that setting signal.

The communication devices 46A and 46B for the remote operation are communicatively connected with the selected construction machine via the remote operation network NT1. The network video signals transmitted from the communicatively connected construction machine via the remote operation network NT1 are received by the communication devices 46A and 46B, converted into video signals, and input into the monitors 45A and 45B. As a result, the camera images of the communicatively connected construction machine are displayed in real-time on the monitors 45A and 45B.

The operators A and B operate the operating devices 44A and 44B while monitoring the video images displayed on the monitors 45A and 45B. The operation signals output from the operating devices 44A and 44B by the operations of the operators A and B are converted into the network operation signals, transmitted from the communication devices 46A and 46B, and transmitted to the communicatively connected construction machine via the remote operation network NT1.

On the other hand, the communication devices 41A and 41B for data communication are connected to the matching server 6 via the matching information network NT2. The operators A and B appropriately operate the input devices 42A and 42B according to the display on the monitors 43A and 43B and log in to the matching server 6. After logging in, the operators A and B check data received from the matching server 6, such as candidates construction machines and work sites, other operators working at the time, etc., on the monitors 43A and 43B, and operate the input devices 42A and 42B to select desired work sites and construction machines. The data input by the input devices 42A and 42B are transmitted from the communication devices 41A and 41B to the matching server 6 via the matching information network NT2.

—Management Terminal—

Here, the management terminal 5 (computer), which is operated by a manager managing the matching server 6, is connected to the matching server 6 via the matching information network NT2. The management terminal 5 is connected to a communication device 51, a monitor 55, and an input devices 56 (keyboard, mouse, etc.). The communication device 51, for example, is similar to the communication device 41A of the remote operation device 4A and serves to connect the management terminal 5 with the matching information network NT2. The manager operates the input device 56 while monitoring the monitor 55 to register data of work 52 performed with the construction machine arranged at the work site 1, skills 53 required for the work 52, and operators 54 registered in the system. These registered data are transmitted to the matching server 6 from the communication device 51 via the matching information network NT2.

Specific examples of the registration contents for the work 52 include, for example, names of the work sites, types and numbers of construction machines arranged at the each work site, and skills (skill 53) required for the work using the each construction machine.

Specific examples of the registration contents for the operator 54 include, for example, personal data (name, age, connection region, ID, password, etc.) of the operators (the operators A and B, etc.), work histories, possessed skills, and desired works, etc. The possessed skills of the operators can be registered not only actual data recorded by the remote operation system, but also self-reported data by the operators.

—Matching Server—

The matching server 6 is a computer comprises a CPU, a memory, and other storage devices, and has a matching function 61 and an operation network control function 62. In the matching function 61, communication processes with the construction machines 2A and 2B, the remote operation devices 4A and 4B, and the management terminal 5 is executed via a communication device 611 equipped with (or connected to) the matching server 6. Additionally, in the matching function 61, an operator authentication process 612, a DB registration process 613, matching process 614, an operator reference process 615, and a work reference process 616 are executed. In the operation network control function 62, the communication control process 621 controls a switch 622 to perform a switching control of the construction machine that becomes the communication connection partner of the remote operation devices 4A and 4B.

The communication device 611 serves to communicate with the construction machines 2A and 2B, the remote operation devices 4A and 4B, and the management terminal 5 via the matching information network NT2. For example, the matching server 6 receives the standby notification (mentioned above) from the construction machines 2A and 2B via the communication device 611. Furthermore, the communication device 611 receives various data registered in the management terminal 5, such as work sites, construction machines, required skills required for the remote operation of the construction machines or works using the construction machines, operators, and skills each operator possesses. From the remote operation devices 4A and 4B, for example, authentication data of the operators A and B, etc., inputted by the input devices 42A and 42B of the remote operation devices 4A and 4B, are received by the communication device 611, and these authentication data are input into the matching server 6.

In the operator authentication process 612, the authentication data of the operators A and B received from the remote operation devices 4A and 4B is queried in the operator DB 617, and it is checked whether the operators A and B are the operators registered in the operator DB 617. Results of the authentication are transmitted to the remote operation devices 4A and 4B via the matching information network NT2.

In the DB registration process 613, when the standby notification from the construction machines 2A and 2B is input, it is reflected in the work DB 618 that the construction machines 2A and 2B is in an operable state. Also, the work site data, construction machine data, and required skill data inputted from the management terminal 5 are stored in the work DB 618 by the DB registration process 613. The authentication data and the possession skill data of the operators A and B inputted from the remote operation devices 4A and 4B and the management terminal 5 are stored in the operator DB 617 by the DB registration process 613.

In the operator reference process 615, personal data such as the possession skills of the operators A and B are referenced from the operator DB 617.

In the work reference process 616, data related to works such as work data, the required skill data, and the construction machine data are referenced from the work DB 618.

In the matching process 614, the possessed skill data of the operators A and B referenced in the operator reference process 615 and the required skill data referenced in the work reference process 616 are compared, and a list of candidate works that the operators A and B respectively can undertake and construction machines that they use is created. The list of candidate works, etc., created is transmitted to the remote operation devices 4A and 4B via the matching information network NT2. In the remote operation devices 4A and 4B, the list of candidate works, etc., is displayed on the monitors 43A and 43B, and presented to the operators A and B. When the operators A and B respectively select their desired work or construction machine from this list and input them using the input devices 42A and 42B, the data of the work and construction machine selected by the operators A and B are entered into the matching server 6 via the matching information network NT2. In the matching process 614, the remote operation devices and the selected construction machine are matched based on the selection of the operators A and B.

In the communication control process 621, the switch 622 is controlled based on the combination of the remote operation devices and the construction machine set by the matching function 61, and the remote operation devices and the construction machine that have been matched are communicatively connected via the remote operation network NT1. As a result, for example, the operators A and B can operate the remote operation devices 4A and 4B and remotely control the connected construction machines to perform work. The setting of the previously mentioned priority operation right is also executed by the communication control process 621.

Afterward, when the operators A and B finish the remote operation at the remote operation devices 4A and 4B, a notification of work completion is sent from the remote operation devices 4A and 4B to the matching server 6 via the communication devices 41A and 41B and the matching information network NT2. At the matching server 6, when the notification of work completion is received via the communication device 611, the communication control process 621 is executed, the switch 622 is controlled, the communication connection between the remote operation devices 4A and 4B and the construction machines 2A and 2B is disconnected, and the matching process 614 is terminated.

In addition, along with the aforementioned termination process, the DB registration process 613 is executed, and actual values such as the work content related to the terminated remote operation, type of construction machines operated, and work time are reflected in the data of the operators A and B stored in the operator DB 617. The work time can be evaluated, for example, by the communication connection time between the remote operation devices 4A and 4B and the construction machines 2A and 2B, the operation time of the operating devices 44A and 44B, or the driving time of actuators of the construction machines 2A and 2B.

—Preparation Work—

Figure 4:
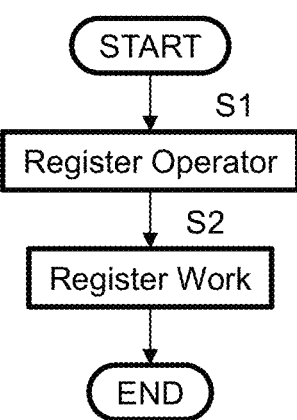
FIG. 4 is a flowchart showing procedures for preparation work (registration work) using the remote operation system of one embodiment of the present invention.

FIG. 4 is a flowchart showing procedures for a preparation work (registration work) using the remote operation system of this embodiment. Using the flowchart in FIG. 4, the procedure for the preparation work using the remote operation system is explained.

(Step S1)

First, in Step S1, for example, data of the operator is registered, for example, by the management operator, using the monitor 55 and the input device 56 of the management terminal 5. The data of the operator registered here includes an identification number of the operator, a password issued for the operator, and the operator's experience time and proficiency in remote operation of construction machine. The proficiency refers to data quantifying the operator's remote operation skills for each type of construction machine, for example, the operation time for each type of work for each type of construction machine, and the operator's level of skill at the work (e.g., operator's declaration). The data of the operator inputted into the management terminal 5 is transmitted to the matching server 6 via the communication device 51 and the matching information network NT2, and is stored in the operator DB 617 through the DB registration process 613.

(Step S2)

In Step S2, for example, data for the requested work is registered using the monitor 55 and the input device 56 of the management terminal 5 by the management operator. The data for the work registered here includes construction machines used for each work, operator's proficiency required to remotely operate the construction machine for each work, and the estimated time required for each work. The data of work inputted into the management terminal 5 is transmitted to the matching server 6 via the communication device 51 and the matching information network NT2, and is stored in the work database 618 through the DB registration process 613.

The preparation work is typically performed in the order of the steps S1 and S2, but the steps S1 and S2 can be performed in any order. Furthermore, the preparation work is performed each time a need arises, and there may be cases where both of the steps S1 and S2 need to be performed, or cases where performing just one of the steps S1 or S2 is sufficient.

—Remote Operation—

Figure 5:
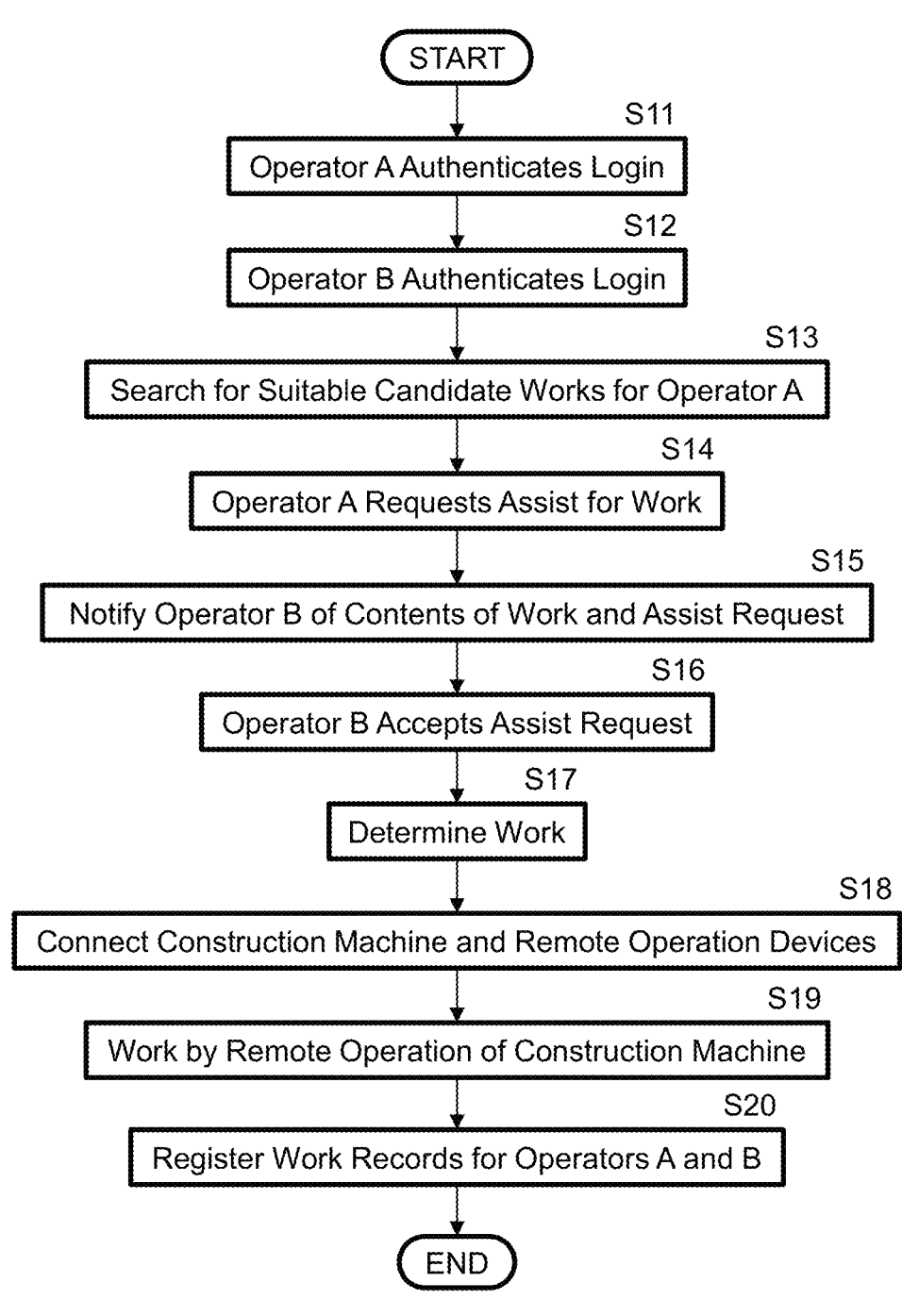
FIG. 5 is a flowchart showing procedures for remote operation of construction machine using the remote operation system of one embodiment of the present invention.

FIG. 5 is a flowchart showing procedures for the remote operation of construction machine using the remote operation system of this embodiment. Using FIG. 5, the procedures for the operators A and B to perform the remote operations of construction machine using the remote operation system of this embodiment is explained. Note that the flowchart in FIG. 5 assumes that the preparation work in FIG. 4 for registering the data of the operators A and B and the data of the work has been completed.

(Step S11)

Step S11 is a procedure for the login authentication of the operator A. First, in the operation room 3, the operator A inputs own ID (identification number) and password by operating the input device 42A while viewing the monitor 43A of the remote operation device 4A. The input ID and password are transmitted to the matching server 6 via the communication device 41A and the matching information network NT2. At the matching server 6, the operator authentication process 612 is executed, and the received ID and password of the operator A are queried to the operator database 617. If the data of the operator A exists in the operator database 617, a notification of authentication OK is sent from the matching server 6 to the remote operation device 4A via the matching information network NT2, and the authentication result (authentication OK) is displayed on the monitor 43A of the remote operation device 4A. If the data of the operator A does not exist in the operator database 617, a notification of authentication NG is sent from the matching server 6 to the remote operation device 4A via the matching information network NT2, and the authentication result (authentication NG) is displayed on the monitor 43A of the remote operation device 4A. If authentication is NG, the flow in FIG. 5 ends there.

(Step S12)

Step S12 is a procedure for the login authentication of the operator B. The procedure of the operator B and processing content of the matching server 6 for the login authentication of the operator B are the same as those for the login authentication of the operator A. The order of login authentication for the operators A and B shown in FIG. 5 is just an example, and the order of login authentication for the operators A and B can be reversed. At this point, it is assumed that the operators A and B do not know whether the other is logged into the system or will be logged into the system.

(Step S13)

Step S13 is a procedure where the matching server 6, based on the operator DB 617 and the work DB 618, searches for and presents candidate works that the logged-in operator A can undertake to the remote operation device 4A operated by the operator A. In the matching server 6, the operator reference process 615 is executed, and data such as the experience time and the proficiency of the operator A in remote operation of construction machine is read from the operator DB 617. Furthermore, the work reference process 616 is executed to search for candidate works suitable for the operator A from the work DB 618, based on the operator A's experience time and proficiency in remote operation of construction machine and the works that can be undertaken. The data of the searched candidate works, along with the data of the candidate construction machines to be used, is transmitted from the matching server 6 to the remote operation device 4A via the matching information network NT2 and displayed on the monitor 43A of the remote operation device 4A.

Note that in the step S13, depending on the search conditions (i.e., the possessed skills of the operator A, etc.), there may be cases where no candidate works matching the search conditions are found, or cases where only one or plural candidate works are extracted. If no candidate works are extracted, the flow in FIG. 5 ends there.

(Step S14)

Step S14 is a procedure where the operator A requests an assist for a work from another operator. The operator A, when selecting the work to be undertaken or the construction machine to be operated from the candidate works displayed on the monitor 43A, checks the data of the work to be selected (operation items to be performed during the work, such as loading and unloading of soil, moving construction machine, etc.). In this example, it is assumed that the work selected from the candidate works includes operation items that operator A is not proficient in. Therefore, the operator A performs the operation to request assist (for example, selecting an operation item for which the assist is requested, and indicating the intention to request assist) for the operation items they are not proficient in. As a result, a notification of the assist request is sent from the remote operation device 4A to the matching server 6 via the matching information network NT2.

(Step S15)

The following step S15 is a procedure where the matching server 6 executes the matching process 614 to search for a second operator to assist the operator A and notifies the second operator extracted by the search of the assist request.

Specifically, in the step S15, if the matching server 6 receives the notification of the assist request for the selected work from the remote operation device 4A, it searches for the second operator among operators who are logged in, based on the operator DB 617 and the work DB 618. The second operator is extracted with respect to the operation items for which assistance is requested as specified by the operator A, for example, the experience time and the proficiency of remote operation of the construction machine (model) to be operated by the operator A as search conditions. Here, it is assumed that the operator B is extracted as the second operator. In this case, the matching server 6 notifies the remote operation device 4B operated by the operator B of the assist request and the work (operation items, etc.) related to the assist request via the matching information network NT2. The content of this notification is displayed on the monitor 43B of the remote operation device 4B.

In cases where the operator B is the only operator suitable as the second operator, or if the operator B is the most suitable as the second operator, it is possible to configure so that only the remote operation device 4B is notified of the assist request. Additionally, in cases where plural operators suitable as the second operator are logged in, it is also possible to configure so that the assist request is notified to the plural remote operation devices operated by these operators.

Furthermore, at the step S14, the operator A may perform the operation of accepting the selected work without making an assist request, and the matching server 6 may receive the notification of the selected work and the acceptance from the remote operation device 4A. In this case, the matching server 6 skips the procedures of steps S15 and S16, moves the procedure from the step S14 to step S17, and matches only one remote operation device 4A with the construction machine.

(Step S16)

Step S16 is a procedure where the operator B accepts the assist request of the operator A. The operator B checks the display on the monitor 43B and operates the input device 42B to input their acceptance or rejection to the assist request. If unable to accept the assist request, the operator B operates the input device 42B to input that the assist request is not accepted. In this case, a notification of non-acceptance of the assist request is sent from the remote operation device 4B to the matching server 6 via the matching information network NT2.

If the notification of non-acceptance is received from the remote operation device that was notified of the assist request, the matching server 6 transmits a notice of the assist request to the remote operation device operated by another candidate for the second operator, if there is another candidate. As a result, if no one accepts the assist request, the matching server 6 transmits a notification to the remote operation device 4A that no one has accepted the assist request to inform the operator A. If unable to obtain assist from others, the operator A can either give up the assist request and undertake the work alone, select another candidate work, or cancel the work contract itself.

On the other hand, if the operator B accepts the assist request, the operator B operates the input device 42B to input that the assist request is to be accepted. In this case, an acceptance notification of the assist request is sent from the remote operation device 4B to the matching server 6 via the matching information network NT2. When the acceptance notification of the assist request is thus received, the matching server 6 executes the matching process 614, transmits data of the operator B to the remote operation device 4A, and displays it on monitor 43A.

The operator A refers to the data of the operator B displayed on the monitor 43A, considers the operator B's skills, etc., decides on the operation items to request assist from the operator B, and operates the input device 42A to input the specific content of the assist request. The data of the assist request is transmitted from the remote operation device 4A to the matching server 6 via the matching information network NT2.

As part of the matching process 614, the matching server 6 transmits the assist request content input by the operator A to the remote operation device 4B, and displays it on the monitor 43B to inform the operator B. The operator B reviews the assist request from the operator A displayed on the monitor 43B, makes a final decision on whether to accept or reject the assist request, and then operates the input device 42B to transmit the acceptance or rejection to matching server 6. If the operator B does not finally accept (decide to accept), the matching server 6, as above, will transmit a notification of the assist request to the remote operation device operated by another candidate for the second operator, if there are other candidates for the second operator. In this example, the case where the operator B decides to accept the assist request is described further.

(Step S17)

Step S17 is a procedure in which matching server 6, as part of the matching process 614, determines the work to be jointly undertaken by the operators A and B. Upon receiving a notification of the decision to accept the assist request from the remote operation device 4B, the matching server 6 transmits to the remote operation devices 4A and 4B through the matching information network NT2 a notifications that matching of the operators A and B and the work has been established to inform the operators A and B. This determines the work to be jointly performed by the operators A and B.

(Step S18)

Step S18 is a procedure where the matching server 6 executes the communication control process 621 upon receiving the notification of the decision to accept the assist request from the remote operation device 4B and connects both of the remote operation devices 4A and 4B and the construction machine to be operated for the selected work based on work database 618. Here, in accordance with the illustration in FIG. 2, it is assumed that the construction machine to be operated is the construction machine 2A. The matching server 6 establishes a communication connection between the remote operation devices 4A, 4B and the construction machine 2A through the remote operation network NT1 and starts measuring the work time (for example, the connection time between the remote operation devices 4A, 4B and construction machine 2A).

Here, when establishing the communication connection between the remote operation devices 4A and 4B and the construction machine 2A, the matching server 6 controls the remote operation network NT1 and sets the priority operation right for the construction machine 2A to the remote operation device 4B, which is the one to assist among the remote control units 4A and 4B. In this case, both of the remote operation devices 4A and 4B can operate the construction machine 2A, but the network operation signal from the remote operation device 4B has priority over the signal from the remote operation device 4A. For example, even during operation by the remote operation device 4A, if the network operation signal is received from the remote operation device 4B, the construction machine 2A will operate in accordance with the network operation signal from the remote operation device 4B.

(Step S19)

Step S19 is a procedure for remotely controlling the construction machine 2A. Once the communication connection between the remote operation devices 4A and 4B and the construction machine 2A is established, the video images captured by the camera 22A is transmitted from the construction machine 2A to the remote operation devices 4A and 4B, and displayed in real-time on the monitors 45A and 45B of the remote operation devices. Basically, it is assumed that the operator A, the first operator who selected the work to be undertaken, operates the operating device 44A while viewing the video images displayed on the monitor 45A. In this case, the network operation signal along with the operation of the operation device 44A is transmitted from the remote operation device 4A to the construction machine 2A, and the construction machine 2A operates and performs the work in accordance with the operation of the operator A.

However, during this time, if the operator B determines that there is something that needs to be corrected the operation of the operator A through the video images displayed on the monitor 45B, the operator B appropriately operate the operating device 44B. When the remote operation device 4B with the priority control right is operated, the construction machine 2A operates according to the operation of the remote operation device 4B, even during the operation by the remote operation device 4A. In this case, for example, the fact that the operation by the remote operation device 4B has been prioritized is displayed on the monitor 45A of the remote operation device 4A, and the operator A is informed that the operation of the operator B has intervened. Of course, in situations where the operator A has requested the operator B to operate the construction machine, the operator B operates the construction machine 2A on behalf of the operator A under the agreement of the operator A and B.

Note that, for example, if the operator B wishes to invalidate the operator A's operation of an operation item that the operator A cannot properly perform due to insufficient skill (such as loading soil, etc.), the operator B operates the operating device 48B to transmit a signal to the matching server 6 to set the priority operation right. As a result, the communication control process 621 is executed, the network operation signal from the remote operation device 4A is invalidated, and the operation of the construction machine 2A by the remote operation device 4A becomes impossible.

Moreover, in cases where inconvenience may arise from the priority operation right uniformly given to the operator B (the assistant), for example, the operators A and B can consult with each other using telephone devices 47A and 47B and transfer the priority operation right between the remote operation devices 4A and 4B. Specifically, by operating the operating devices 48A and 48B, a predetermined setting signal is transmitted from the remote operation devices 4A and 4B to the matching server 6. Upon receiving this setting signal, the matching server 6 selectively sets the priority operation right of the construction machine 2A to one of the remote operation devices 4A and 4B based on the setting signal. This allows, for example, the transfer of the remote operation right set in the remote operation device 4B to the remote operation device 4A.

Furthermore, the consultation between the operators A and B are not limited to voice calls, they can also be substituted with other means of communication, such as transmitting and receiving text messages via chat, for example.

Then, after completing the scheduled work, the operator A or B (for example, the operator with the priority operation right) operates the input device 42A or 42B of the remote operation device 4A or 4B they are operating, and transmits a termination signal to the matching server 6 via the matching information network NT2. Upon receiving the termination signal, the matching server 6 executes the communication control process 621 and disconnects the communication connection between the remote operation devices 4A and 4B and the construction machine 2A.

(Step S20)

Step S20 is a procedure for updating the operator database DB 617 by adding actual records related to the remote operation of the operators A and B after the completion of the work. The matching server 6 ends the measurement of the work time as the communication connection between the remote operation devices 4A and 4B and the construction machine 2A is disconnected. Then, the matching server 6 executes the DB registration process 613 and updates the operator DB 617 and work DB 618 based on data such as the work time of the operators A and B and the ratio of assist time in the work time with respect to the work. Here, data such as the type of construction machine operated, work time, type of work, operation items, and the proportion of assist time, for example, are updated. With the update of these data, data such as the work that the operators A and B can undertake or assist with are also updated by meeting certain predetermined conditions set in advance. The data of the operator DB 617 and the work DB 618 after the update (or differential data before and after the update) are transmitted from the matching server 6 to the management terminal 5.

—Effects—

(1) According to this embodiment, in response to the assist request of the operator A who undertakes the remote operation of construction machine, the operator B who can respond to the assist request is matched, and the different remote operation devices 4A and 4B operated by the operators A and B are connected to the same construction machine 2A. This allows works that are difficult for the operator A alone to be performed with the assistance of the operator B, and by increasing the flexibility of matching between operators and works, it becomes easier to secure operators who are often in short supply.

Furthermore, according to this embodiment, the operator A can delegate operations they are not good at to the operator B and learn the operations performed by the operator B through the monitor 45A during the process of the work. Thus, operators can learn skills that others possess through demonstration via the remote operation system for operations they are not good at, and effectively acquire the remote operation skills without relying on their own methods.

In this way, according to this embodiment, it is possible to efficiently enhance the skills of operators in remote operation of construction machine.

(2) Moreover, in this embodiment, when the plurality of remote operation devices are communicatively connected to the same construction machine, the remote operation device operated by the operator who is requested to assist is given the priority control right. This allows, for example, the operator B to intervene in the operation of the operator A and operate the construction machine if there are dangerous aspects to operation of the operator A, thereby achieving effects in terms of work failures and helping the Operator A to acquire skills.

(3) Also, for example, the operator B who receives an assist request can disable the network operation signal of the remote operation device 4A operated by the operator A by operating and setting the operating device 48B. This can invalidate any mistaken operations made by the operator A during the assist operations by the operator B, preventing unexpected interference with the operation of the operator B.

Furthermore, the operation of the remote operation device 4A by the operator A who receives assist is invalidated, the operator A can freely operate the operating device 44A while viewing the monitor 45A. This allows the operator A, for example, to operate the operating device 44A in accordance with the movements of the construction machine 2A operated by the operator B as shown on the monitor 45A, and effectively acquire remote operation skills by emulating and experiencing the operation of the operator B.

(4) Also, the priority operation right can be transferred between the remote operation devices 4A and 4B through appropriate consultation between the operators A and B. This allows for flexible setting of the priority operation right according to the situation, for example, when it is undesirable for the operator B who requested the assist to intervene, the operator A who requested the assist may have the priority operation right by itself.

—Modification—

In the embodiment described above, the case where the communication connection between the remote operation devices 4A and 4B and the construction machine 2A is established after the acceptance of the operator B to the assist request of the operator A is determined was explained. However, the timing for establishing the communication connection between the remote operation device 4A operated by the operator A and the construction machine 2A is not limited to the example mentioned above. For example, it is also possible to configure such that the communication connection between the remote operation device 4A and the construction machine 2A is established when the operator A selects the work and the construction machine 2A from among the candidate works before issuing the assist request. In other words, it is also possible to configure not only to execute the procedure of the assist request before the start of the work of the operator A but also to execute the procedure of the assist request when it actually becomes necessary after the start of the work.

Furthermore, a configuration in which the operator DB 617 and the work DB 618 are stored in the matching server 6 is illustrated in FIG. 3. However, at least one of the operator DB 617 and the work DB 618 may not be stored in the storage device of the matching server 6, but may be stored in another computer (for example, the management terminal 5). In this case, not only a single computer (the matching server 6) but also plural computers (for example, the matching server 6 and the management terminal 5) constitute the matching server related to the invention.

DESCRIPTION OF REFERENCE NUMERALS

2A, 2B . . . Construction Machine,
4A, 4B . . . Remote Operation Device,
5 . . . Management Terminal (Matching Server),
6 . . . Matching Server,
617 . . . Operator DB (Database),
618 . . . Work DB (Database)

The invention claimed is:

1. A remote operation system including a construction machine, a plurality of remote operation devices for remotely operating the construction machine, and a matching server for matching any of the plurality of remote operation devices with the construction machine, wherein
the matching server is configured to
store a database including authentication data of a plurality of operators, possessed skill data related to skills possessed by each of the plurality of operators, construction machine data related to the construction machine arranged at a work site, and required skill data related to skills required for operations using the construction machine at the work site,
search for candidate works that can be contracted by a first operator of the plurality of operators based on the database and present the candidate works to a first remote operation device operated by the first operator who has logged in and authenticated,
search for a second operator of the plurality of operators, when a notification of an assist request from the first remote operation device for a selected work selected from the candidate works is received, wherein the second operator can assist the selected work from among the operators logged-in to the server of the plurality of operators based on the database,
inform a second remote operation device operated by the second operator of the assist request and the work related to the assist request, and
communicatively connect both of the first and second remote operation devices to the construction machine to be operated for the selected work based on the database, when a notice of acceptance of the assist request from the second remote operation device is received.

2. The remote operation system according to claim 1, wherein
the matching server sets a priority operation right for the construction machine to be operated to the second remote operation device among the first or second remote operation devices.

3. The remote operation system according to claim 2, wherein
the matching server invalidates the operation of the construction machine to be operated by the first remote operation device based on a setting signal from the second remote operation device.

4. The remote operation system according to claim 1, wherein
the matching server selectively sets a priority operation right of the construction machine to be operated to either the first or the second remote operation device based on a setting signal from the first and the second remote operation devices.

\* \* \* \* \*